US011359425B2

(12) United States Patent
Chang

(10) Patent No.: US 11,359,425 B2
(45) Date of Patent: Jun. 14, 2022

(54) DUAL-SHAFT HINGE WITH ALTERNATIVE ROTATION

(71) Applicant: JARLLYTEC CO., LTD., New Taipei (TW)

(72) Inventor: Kai-Lan Chang, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 268 days.

(21) Appl. No.: 16/892,989

(22) Filed: Jun. 4, 2020

(65) Prior Publication Data

US 2021/0172225 A1    Jun. 10, 2021

(30) Foreign Application Priority Data

Dec. 9, 2019  (TW) ................................. 108144994

(51) Int. Cl.
| | |
|---|---|
| *E05D 3/06* | (2006.01) |
| *E05D 3/18* | (2006.01) |
| *G06F 1/16* | (2006.01) |
| *E05D 15/48* | (2006.01) |

(52) U.S. Cl.
CPC ............. *E05D 3/18* (2013.01); *G06F 1/1681* (2013.01); *E05D 2015/485* (2013.01)

(58) Field of Classification Search
CPC ................................ E05D 3/18; G06F 1/1681
See application file for complete search history.

(56) References Cited

U.S. PATENT DOCUMENTS

| | | | | |
|---|---|---|---|---|
| 8,776,319 | B1* | 7/2014 | Chang ................... | G06F 1/1681 16/303 |
| 9,201,465 | B2* | 12/2015 | Meyers ................. | G06F 1/1681 |
| 9,261,900 | B2* | 2/2016 | Hsu ........................ | G06F 1/1681 |
| 9,274,566 | B1* | 3/2016 | Horng ................... | G06F 1/1681 |
| 9,290,976 | B1* | 3/2016 | Horng ................... | G06F 1/1618 |
| 9,310,849 | B2* | 4/2016 | Hsu ........................ | H04M 1/022 |
| 9,439,311 | B2* | 9/2016 | Hsu ......................... | E05D 3/122 |
| 9,547,342 | B2* | 1/2017 | Horng ................... | G06F 1/1681 |
| 9,752,360 | B2* | 9/2017 | Chuang ................ | G06F 1/1681 |
| 9,791,895 | B2* | 10/2017 | Hsu ........................ | G06F 1/1681 |
| 9,869,114 | B1* | 1/2018 | Hung ........................ | E05D 3/18 |
| 10,175,729 | B2* | 1/2019 | Kuramochi ........... | G06F 1/1616 |
| 10,480,226 | B1* | 11/2019 | Chen ....................... | F16C 11/04 |
| 10,563,438 | B1* | 2/2020 | Chen ..................... | E05D 11/082 |
| 10,747,271 | B2* | 8/2020 | Lin ........................ | G06F 1/1618 |
| 2015/0189777 | A1* | 7/2015 | Hsu ........................ | G06F 1/1681 16/366 |

FOREIGN PATENT DOCUMENTS

TW            M491324         12/2014

* cited by examiner

*Primary Examiner* — Jason W San
(74) *Attorney, Agent, or Firm* — Guice Patents PLLC

(57) ABSTRACT

A dual-shaft hinge with alternative rotation includes: a pivotal base, and having an axial swinging member and a radial moving member; a first core shaft, having a first shaft rod, a first guiding slot and a first latching slot, and the first core shaft is formed in an unlocked status when the first latching slot is engaged with the radial moving member; and a second core shaft, having a second shaft rod, a second guiding slot and at least one second latching slot; the second core shaft is formed in a locked status when the at least one second latching slot is engaged with the radial moving member, and the first core shaft is in the unlocked status, thereby enabling the first core shaft and the second core shaft to alternatively rotate.

20 Claims, 12 Drawing Sheets

C-C

DUAL-SHAFT HINGE WITH ALTERNATIVE ROTATION

BACKGROUND OF THE INVENTION

1. Field of the Invention

The present invention relates to a dual-shaft hinge, especially to a dual-shaft hinge with alternative rotation.

2. Description of Related Art

A conventional foldable electronic device, for example a notebook computer or a mobile phone, is installed with a hinge device, and the hinge device enables a screen to be folded or unfolded relative to a main body. A conventional hinge device is often formed as a single-shaft type and includes a pivotal base fasten on a screen of an electronic device, the pivotal base has a shaft hole allowing a core shaft to pass, the core shaft is fasten on a main body of the electronic device by utilizing a fastening seat; with the pivotal base being rotated relative to the core shaft, the screen of the electronic device is able to be folded or unfolded relative to the main body.

For providing more conveniences to operate the screen or the main body, the skilled people in the art have developed a dual-shaft hinge device, the dual-shaft hinge device are respectively sleeved on two core shafts through two gears which are mutually engaged, the two core shafts are respectively fastened on the screen and the main body of the electronic device, so that when the screen and the main body are processed with a folding or unfolding operation, the two gears can be relatively rotated to an angle greater than 180 degrees without interfering each other, thus effects of easy to be touch controlled for operation and easy to be held are achieved, However, due to various factors, for example the manufacturing tolerance of the gear and the tolerance between a plurality of gears and a plurality of gear shafts, a gap may generate between the gears of the above-mentioned dual-shaft hinge device, and a back slash phenomenon is thereby generated. As such, when an external impact or vibration is applied to the foldable electronic device, under the back slash phenomenon provided to the screen, the screen may be upwardly displaced in the rotating direction or forms wobbling movements. Accordingly, when a user uses the foldable electronic device to watch the screen which may generates micro movements, his/her eyes of a user would easily feel tired.

For solving the above-mentioned disadvantages, the skilled people in the art have developed a dual-shaft hinge with alternative rotation, for example Taiwan Patent Registration No. M491324 (equivalent to China Patent NO. 2014204311.1X) has disclosed a dual-shaft hinge with alternative rotation, which includes a connection unit having a frame member, a first core shaft, a second core shaft, an axial moving unit and a radial moving unit. One end of the axial moving member is formed in a Y shape and is a bolt column inserted in a spiral groove of the second core shaft, thereby being able to axially sliding out for entering or retracting from the frame member, thus the bolt column is subjected to a greater shearing force during an actual rotating process of the second core shaft, thereby causing the bolt column to be easily broken or damaged, and a requirement of service life test is unable to pass. Moreover, for enabling the first core shaft and the second core shaft to alternatively in the frame member, one of the two core shafts forms a second rotating effect while being normally rotated and reversely rotated, as such, the first core shaft and the second core shaft are required to be correspondingly disposed with a first block part and a second block part, and a mutual blocking effect can be established through the second block part of the second core shaft and a frame block part of the frame member and a fan-shaped block ring sleeved with the first core shaft and the axial moving member, thereby forming an alternative blocking effect. However, the processing procedure and the cost of components of the above-mentioned dual-shaft hinge are increased.

Accordingly, the above-mentioned disadvantages shall be improved.

SUMMARY OF THE INVENTION

One primary objective of the present invention is to provide a dual-shaft hinge with alternative rotation, which can solve disadvantages of the conventional axial moving member not having a sufficient structural strength and not easy to pass a service life requirement, and a guiding slot is respectively disposed in two core shafts for replacing the two sets of block parts of the above-mentioned two conventional core shafts, and the installation of the fan-shaped block ring is not required, and the same alternating and blocking effect can be generated, so that advantages of simplifying production process, reducing processing procedures and required components and lowering the production cost can be provided.

For achieving said objective, one technical solution provided by the present invention is to provide a dual-shaft hinge with alternative rotation, which includes a pivotal base, axially formed with a bottom penetrated hole and a top penetrated hole, and having an axial swinging member radially protruded with a bottom guiding tenon and a top guiding tenon and a radial moving member having a bottom arc-shaped surface and a top arc-shaped surface radially formed at at least one side thereof and spaced with an interval; a first core shaft, having one end axially extended with a first shaft rod received in the bottom penetrated hole, wherein an outer circumference of the first core shaft has a first guiding slot and a first latching slot arranged at locations corresponding to the bottom guiding tenon and the bottom arc-shaped surface; an interior of the first guiding slot has a first start end and a first terminal end allowing the bottom guiding tenon to be abutted for forming a blocking effect, and a right block end and a left block end oppositely disposed and arranged between the first start end and the first terminal end, and the first core shaft is formed in an unlocked status when the first latching slot is engaged with the bottom arc-shaped surface; and a second core shaft, having one end axially extended with a second shaft rod received in the top penetrated hole, wherein an outer circumference of the second core shaft has a second guiding slot and at least one second latching slot arranged at locations corresponding to the top guiding tenon and the top arc-shaped surface; an interior of the second guiding slot has a second start end and a second terminal end allowing the top guiding tenon to be abutted for forming the blocking effect, and the second core shaft is formed in a locked status when the at least one second latching slot is engaged with the top arc-shaped surface, and the first core shaft is in the unlocked status, thereby enabling the first core shaft and the second core shaft to alternatively rotate.

For achieving said objective, another technical solution provided by the present invention is to provide a dual-shaft hinge with alternative rotation, which includes a pivotal base, axially formed with a bottom penetrated hole and a top penetrated hole, and having an axial swinging member radially protruded with a bottom guiding tenon and a top guiding tenon and a radial moving member having a bottom arc-shaped surface and a top arc-shaped surface radially formed at at least one side thereof and spaced with an interval; a first core shaft, having one end axially extended with a first shaft rod received in the bottom penetrated hole, wherein the first shaft rod is sleeved with a first linkage ring, the first linkage ring has a first guiding slot at a location corresponding to the bottom guiding tenon, and an outer circumference of the first core shaft has a first latching slot at a location corresponding to the bottom arc-shaped surface; an interior of the first guiding slot has a first start end and a first terminal end allowing the bottom guiding tenon to be abutted for forming a blocking effect, and a right block end and a left block end oppositely disposed and arranged between the first start end and the first terminal end, and the first core shaft is formed in a locked status when the first latching slot is engaged with the bottom arc-shaped surface; and a second core shaft, having one end axially extended with a second shaft rod received in the top penetrated hole, the second shaft rod is sleeved with a second linkage ring, the second linkage ring has a second guiding slot at a location corresponding to the top guiding tenon, and an outer circumference of the second core shaft has at least one second latching slot at a location corresponding to the top arc-shaped surface; an interior of the second guiding slot has a second start end and a second terminal end allowing the top guiding tenon to be abutted for forming the blocking effect, and the second core shaft is formed in a locked status when the at least one second latching slot is engaged with the top arc-shaped surface, and the first core shaft is in an unlocked status, thereby enabling the first core shaft and the second core shaft to alternatively rotate.

According to one embodiment of the present invention, the first core shaft has a first connection part disposed at another end thereof, the first connection part has a plurality of first fastening holes for allowing a first supporter to be connected; and the second core shaft has a second connection part disposed at another end thereof, the second connection part has a plurality of second fastening holes for allowing a second supporter to be connected.

According to one embodiment of the present invention, the first latching slot is formed on a lateral surface of the first core shaft, there are two second latching slots, and the two second latching slots are respectively arranged on a top surface and a bottom surface of the second core shaft, thereby forming a locked status by being latched with the top arc-shaped surface.

According to one embodiment of the present invention, a torque unit is further provided, the torque unit has a plurality of sheet-like torque clipping sheets which are in mutually stacked status, a bottom end and a top end of each of the torque clipping sheets respectively have a C-shaped bottom clipper allowing the first shaft rod to be disposed and clipped, and a C-shaped top clipper allowing the second shaft rod to be disposed and clipped.

According to one embodiment of the present invention, the torque unit further has at least one fastening sheet, the at least one fastening sheet is arranged to be adjacent to the torque clipping sheets, and a bottom end and a top end of each of the fastening sheets respectively have a bottom sheet hole allowing the first shaft rod to pass, and a top sheet hole allowing the second shaft rod to pass.

According to one embodiment of the present invention, there are at least two fastening sheets, and a friction pad allowing the first shaft rod and the second shaft rod to pass and link is respectively disposed between the bottom sheet holes and the top sheet holes of the two adjacent fastening sheets.

According to one embodiment of the present invention, the first core shaft and the second core shaft are respectively connected to a torque auxiliary adjusting unit, each of the torque auxiliary adjusting units has an elastic member respectively allowing the first shaft rod and the second shaft rod to pass, and a tightening member allowing the first shaft rod and the second shaft rod to be respectively tighten.

According to one embodiment of the present invention, the elastic member is selected from a group consisted of a spring, a plurality of disc elastic sheets and a plurality of wave-shaped elastic sheets.

According to one embodiment of the present invention, a friction pad is disposed between the elastic member and the tightening member.

According to one embodiment of the present invention, two opposite sides of the pivotal base are oppositely extended with a pair of side walls, and two shaft bolts are disposed on the pair of side walls and spaced with an interval, one of the shaft bolts, defined as a first shaft bolt, is pivoted with the axial swinging member, and the other shaft bolt, defined as a second shaft bolt, is pivoted with the radial moving member; a lateral surface of the radial moving member has an elongated hole allowing the second shaft bolt to pass, so that the second shaft bolt is able to be in contact with a bottom hole of the elongated hole end when the top arc-shaped surface is engaged with the at least one latching slot, and the second shaft bolt is able to be in contact with a top hole end of the elongated hole when the bottom arc-shaped surface is engaged with the first latching slot.

According to one embodiment of the present invention, two opposite sides of the pivotal base are oppositely extended with a pair of side walls, a first shaft bolt is provided to pass one of the two pair of side walls so as to be pivoted with the axial swinging member, and a second shaft bolt is provided to pass the other pair of side walls so as to be pivoted with the radial moving member; a lateral surface of the radial moving member has an elongated hole allowing the second shaft bolt to pass, so that the second shaft bolt is able to be in contact with a bottom hole end of the elongated hole when the top arc-shaped surface is engaged with the at least one latching slot, and the second shaft bolt is able to be in contact with a top hole end of the elongated hole when the bottom arc-shaped surface is engaged with the first latching slot.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
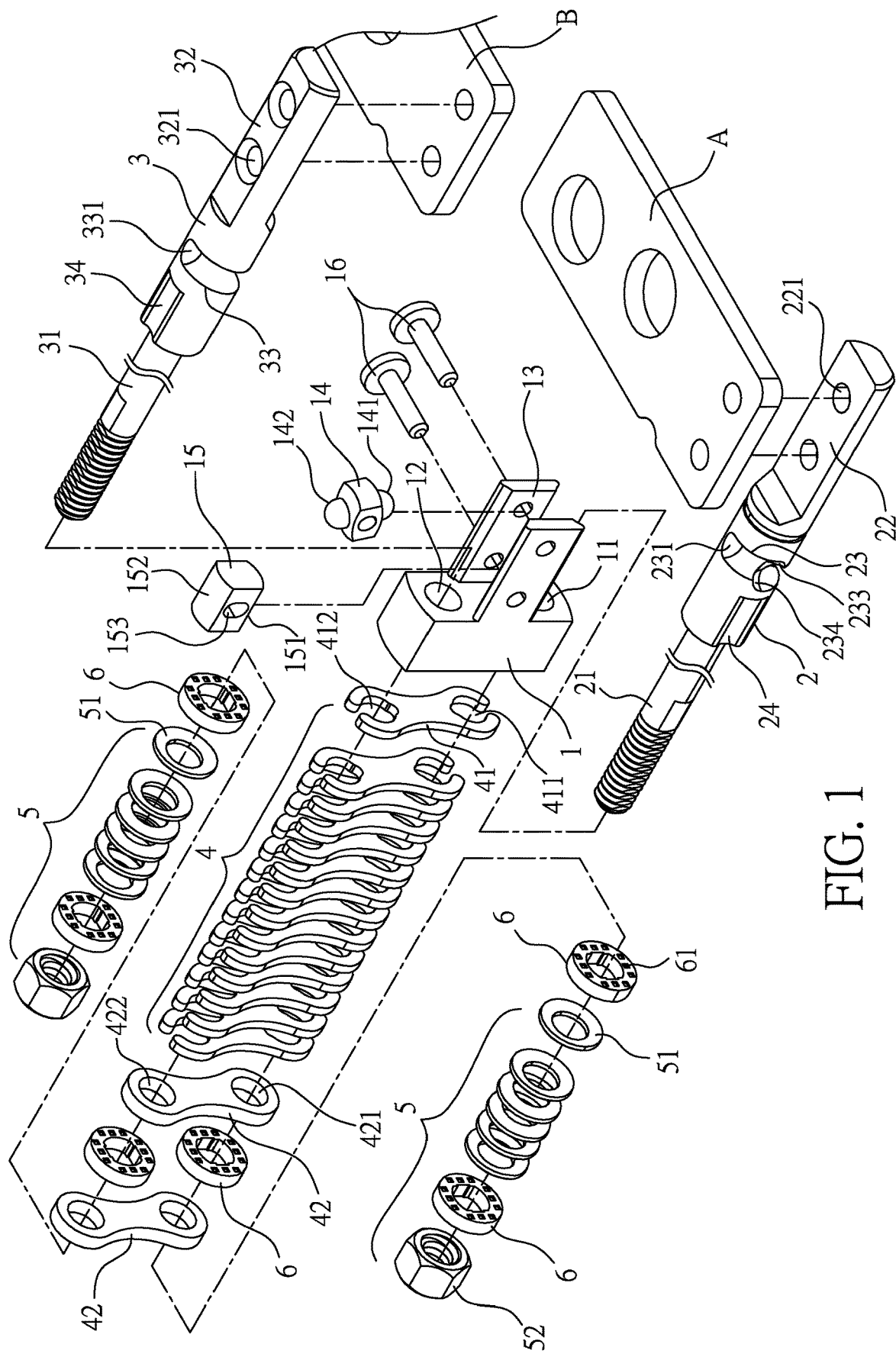
FIG. 1 is a perspective exploded view illustrating the dual-shaft hinge according to a first embodiment of the present invention.

Please refer from FIG. 1 to FIG. 4b, the preset invention discloses a dual-shaft hinge with alternative rotation, which includes a pivotal base 1, a first core shaft 2, a second core shaft 3, a torque unit 4 and two sets of torque auxiliary adjusting units 5.

The pivotal base 1 is axially formed with a bottom penetrated hole 11 and a top penetrated hole 12, and at least one side thereof, for example the right side, is oppositely protruded with a pair of side walls 13, two shaft bolts 16 are disposed in the pair of side walls 13 and arranged with an interval, thereby allowing an axial swinging member 14 and a radial moving member 15 to be respectively pivoted and spaced with an interval. Wherein, one of the shaft bolts 16 (hereinafter defined as a first shaft bolt 16) pivots with the axial swinging member 14 having a bottom guiding tenon 141 and a top guiding tenon 142 radially protruding from a bottom end and a top end thereof respectively; and the other shaft bolt 16 (hereinafter defined as a second shaft bolt 16) pivots with the radial moving member 15 having a bottom arc-shaped surface 151 and a top arc-shaped surface 152 formed on a bottom end and a top end thereof respectively. An elongated hole 153 allowing the second shaft bolt 16 to be received is formed on a lateral surface of the radial moving member 15, so that a blocking effect can be formed when the second shaft bolt 16 is in contact with a bottom hole end or a top hole end of the elongated hole 153, and the radial moving member 15 is able to be stably limited to radially move between the pair of side walls 13.

The first core shaft 2 has a first shaft rod 21 axially extended from one end thereof and received in the bottom penetrated hole 11 and a first connection part 22 disposed at another end thereof, the first connection part 22 has a plurality of first fastening holes 221 for allowing conventional connecting members, for example rivets, to pass the first fastening holes 221 so as to be locked on an electronic device, for example a first supporter A of a main body of a notebook computer.

Figure 2:
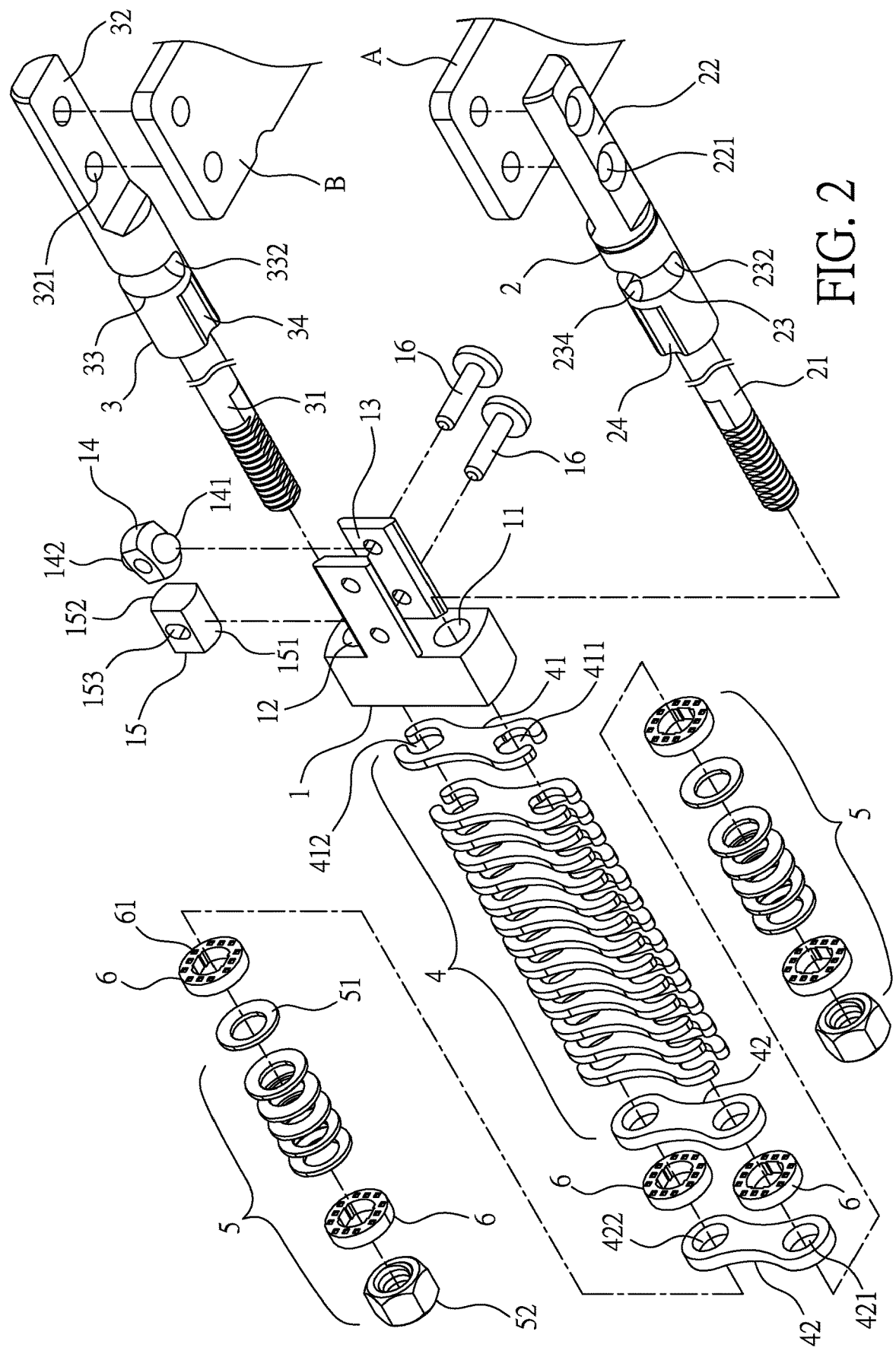
FIG. 2 is another perspective exploded view illustrating the dual-shaft hinge according to the first embodiment of the present invention.
Figure 8B:
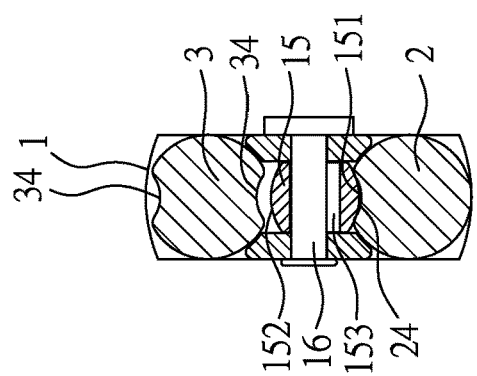
FIG. 8b is a cross sectional view of FIG. 7 taken along a C-C line.

Moreover, an outer circumference of the first core shaft 2 has a first guiding slot 23 and a first latching slot 24 arranged at locations corresponding to the bottom guiding tenon 141 and the bottom arc-shaped surface 151. The first guiding slot 23 has two radial slot segments parallel to each other, and an axial slot segment connected between the two radial slot segments, the interior of the first guiding slot 23 has a first start end 231 and a first terminal end 232 allowing the bottom guiding slot 141 to be abutted for forming a blocking effect (as shown in FIG. 2), and a right block end 233 and a left block end 234 oppositely disposed and arranged between the first start end 231 and the first terminal end 232. Wherein, the first start end 231 is disposed at one end of the two radial slot segments, the first terminal end 232 is disposed at another end of the two radial slot segments, and the right block end 233 and the left block end 234 are disposed at connecting locations defined at two opposite ends of the two radial slot segments and the axial slot segment, thereby limiting the bottom guiding tenon 141 to displace in the first guiding slot 23. As shown in FIG. 1, the first latching slot 24 is disposed on a lateral surface of the first core shaft 2, so that the first core shaft 2 is in an unlocked status (as shown in FIG. 8b) while the first latching slot 24 being engaged with the bottom arc-shaped surface 151.

The whole structure of the second core shaft 3 is similar to that of the first core shaft 2, thus the second core shaft 3 has a second shaft rod 31 axially extended from one end thereof and received in the top penetrated hole 12 and a second connection part 32 disposed at another end thereof, the second connection part 32 has a plurality of second fastening holes 321 for allowing conventional connecting members, for example rivets, to pass the second fastening holes 321 so as to be locked on an electronic device, for example a second supporter B of a screen of the notebook computer.

Moreover, an outer circumference of the second core shaft 3 has a second guiding slot 33 and a second latching slot 34 arranged at locations corresponding to the top guiding tenon 142 and the top arc-shaped surface 152. The second guiding slot 33 is substantially formed as an arc-shaped spiral slot, the interior of the second guiding slot 33 has a second start end 331 and a first terminal end 332 allowing the top guiding slot 141 to be abutted for forming a blocking effect (as shown in FIG. 2), thereby limiting the top guiding tenon 142 to displace in the second guiding slot 33. As shown in FIG. 1 and FIG. 2, there are two second latching slots 34, and the two second latching slots 34 are respectively arranged on a top surface and a bottom surface of the second core shaft 3, thereby forming a locked status by selectively being latched with the top arc-shaped surface 152. In other words, the second core shaft 3 is locked and the first core shaft 2 is unlocked when the at least one second latching slot 34 is engaged with the top arc-shaped surface 152.

The torque unit 4 has a plurality of sheet-like torque clipping sheets 41 which are mutually stacked, a bottom end and a top end of each of the torque clipping sheets 41 respectively have a C-shaped bottom clipper 411 allowing the first shaft rod 21 to be disposed and clipped, and a C-shaped top clipper 412 allowing the second shaft rod 31 to be disposed and clipped. As such, the amounts of the torque clipping sheets 41 of the torque unit 4 can adjust a torque of the first core shaft 2 and that of the second core shaft 3 to a preset value.

Moreover, the torque unit 4 further has at least one fastening sheet 42, the at least one fastening sheet 42 is arranged to be adjacent to the torque clipping sheets 41, and a bottom end and a top end of each of the fastening sheets 42 respectively have a bottom sheet hole 421 allowing the first shaft rod 21 to pass, and a top sheet hole 422 allowing the second shaft rod 31 to pass.

Please refer to FIG. 1 and FIG. 2, there are at least two fastening sheets 42, and a friction pad 6 allowing the first shaft rod 21 and the second shaft rod 31 to pass and link is respectively disposed between the bottom sheet holes 421 and the top sheet holes 422 of the two adjacent fastening sheets 42. Moreover, the friction pad 6 allowing the first shaft rod 21 and the second shaft rod 31 to pass and link is also disposed between the fastening sheets 42 and each set of the torque auxiliary adjusting units 5 which is adjacently disposed. Wherein, at least one lateral surface of each of the friction pads 6 has a plurality of oil storing holes 61 annularly arranged and allowing lubrication oil to be accommodated so as to provide a lubricating effect to adjacent components, for example the fastening sheets 42, thus the first core shaft 2 and the second core shaft 3 are able to generate a friction torque through the two friction pads 6 thereof and the adjacent components; accordingly, based on the preset torque value of the plural torque clipping sheets 41, each of the torque auxiliary adjusting units 5 can slightly adjust a torque value of the first core shaft 2 and that of the second core shaft 3 to be within a preset range.

The first core shaft 2 and the second core shaft 3 are connected to each of the torque auxiliary adjusting units 5, respectively. Each of the torque auxiliary adjusting units 5 has an elastic member 51 respectively allowing the first shaft rod 21 and the second shaft rod 31 to pass, and a tightening member 52, for example an anti-loosening screw nut, allowing the first shaft rod 21 and the second shaft rod 31 to be respectively tightened, thereby enabling the torque value of the first core shaft 2 and that of the second core shaft 3 to be slightly adjusted, As shown in FIG. 1 and FIG. 2, the elastic member 51 is selected from a plurality of disc elastic sheets, but what shall be addressed is that the scope of the present invention is not limited to be above-mentioned arrangement; according to another embodiment, the elastic member 51 is selected from a group consisted of a spring or a plurality of wave-shaped elastic sheets. As such, during alternative rotations of the first core shaft 2 and the second core shaft 3, the first core shaft 2 and the second core shaft 3 are subjected to an elastic effect provided by each of the elastic members 51 for forming an axial torque variation and generating a stopping and positioning effect.

Moreover, the above-mentioned friction pad 6 is disposed between the elastic member 51 and the tightening member 52, so that the tightening member 52 and the elastic member 51 can be prevented from being in a direct frictional status and wearing can be avoided, and the torque can be stably kept within the preset range. According to another embodiment, the torque auxiliary adjusting unit 5 is not a necessary component, thus the torque auxiliary adjusting unit 5 can be optionally adopted according an actual torque requirement.

Figure 3:
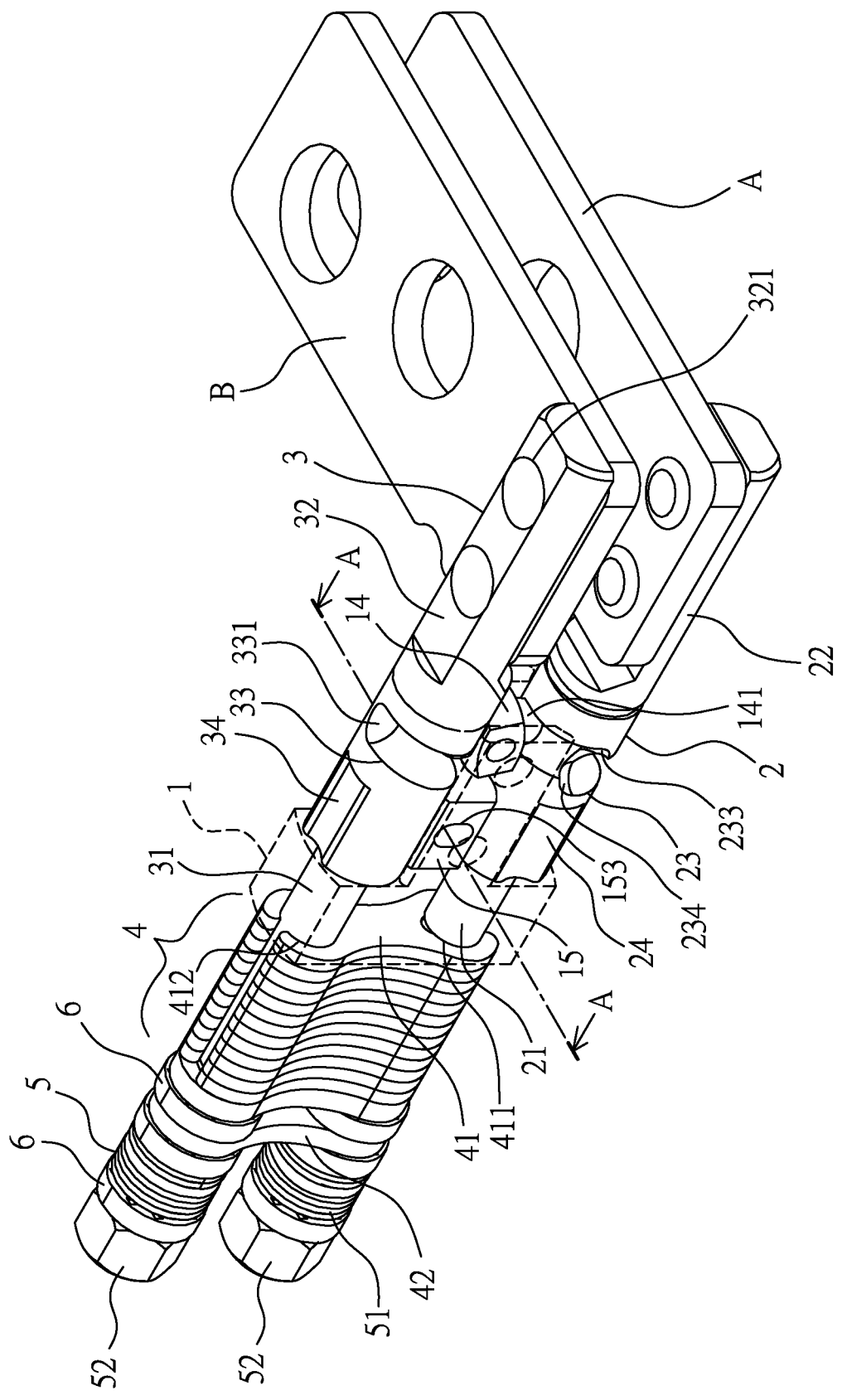
FIG. 3 is a perspective view illustrating the assembly of dual-shaft hinge and a non-operating status of the first core shaft and the second core shaft being in zero degrees according to the first embodiment of the present invention.

As shown in FIG. 3, which is a perspective view illustrating the assembly of the pivotal base 1, the first core shaft 2, the second core shaft 3, the torque unit 4 and the two sets of torque auxiliary adjusting unit 5. When the first supporter A is connected to an electronic device, for example a main body of a notebook computer, and the second supporter B is connected to the electronic device, for example a screen of the notebook computer. The first supporter A and the second supporter B are arranged in parallel, thereby forming a first angle, for example zero degrees. Please refer to FIG. 4a and FIG. 4b, at this moment, the top guiding tenon 142 of the axial swinging member 14 is abutted against the second terminal end 332 in the second guiding slot 33, and the bottom guiding tenon 141 of the axial swinging member 14 is abutted against the first start end 231 of the first guiding slot 23 (as shown in FIG. 4a); and the bottom arc-shaped surface 151 of the radial moving member 15 is adjacent to the outer circumference of the first core shaft 2, and the top arc-shaped surface 152 is latched in the second latching slot 34 (as shown in FIG. 4b, at this moment the second shaft bolt 16 is in contact with the bottom hole end of the elongated hole 153), thereby allowing the second core shaft 3 to be in a locked status and the first core shaft 2 to be in an unlocked status. In other words, the second core shaft 3 is latched by the radial moving member 15 and locked thereby unable to rotate, and only the first core shaft 2 is allowed to rotate.

Figure 5:
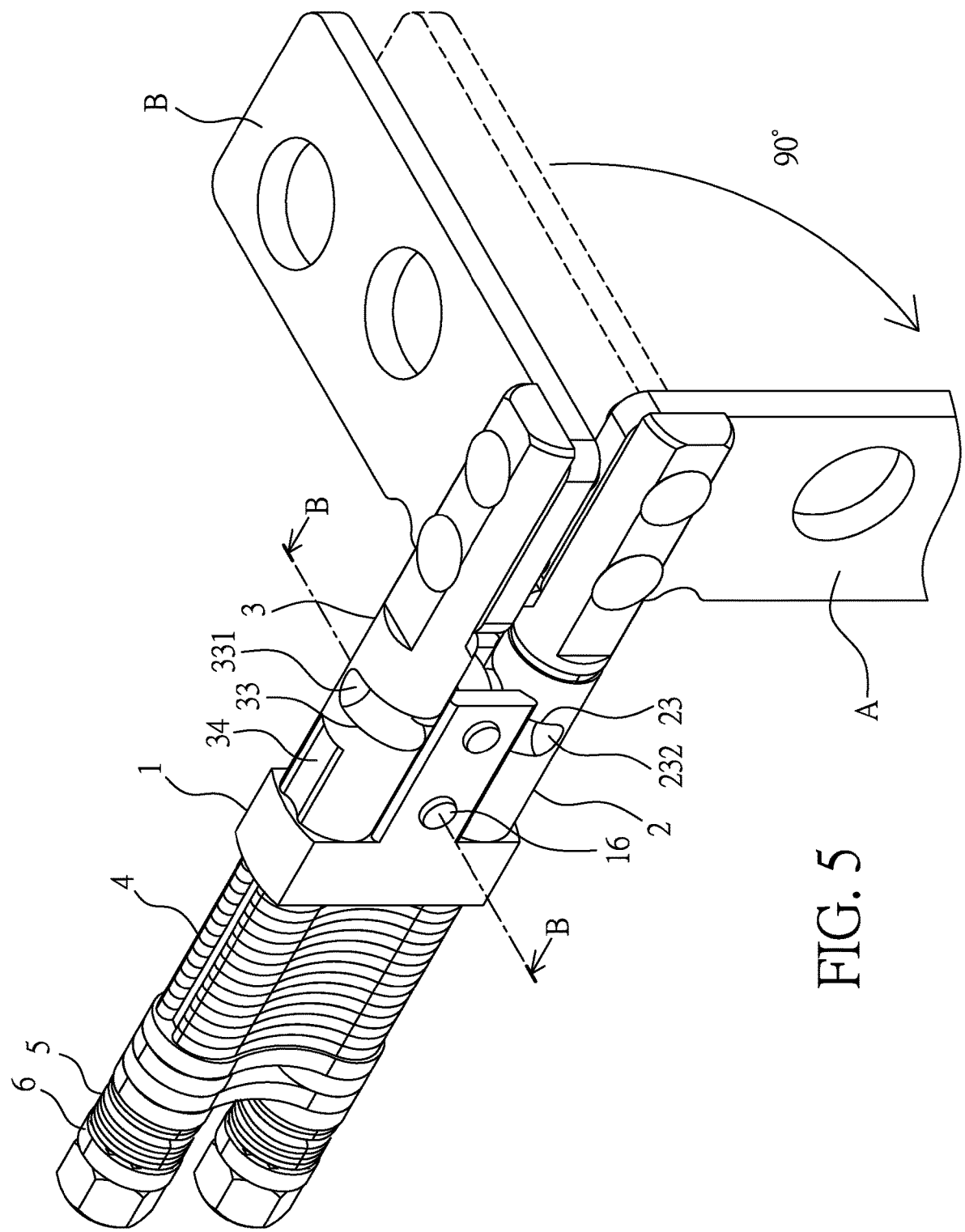
FIG. 5 is a perspective view illustrating the first core shaft being rotated 180 degrees relative to the second core shaft according to the present invention.
Figure 6:
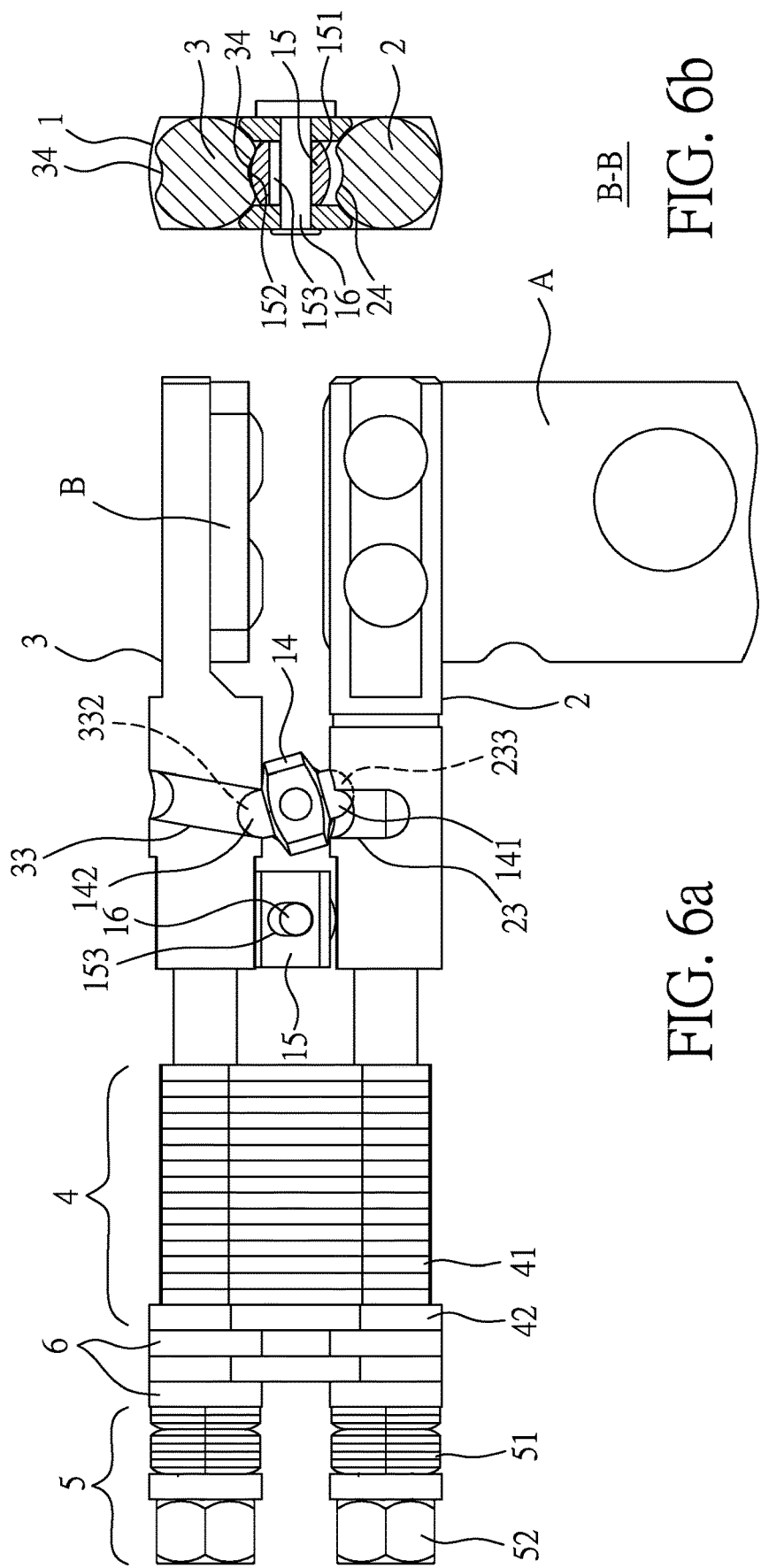
FIG. 6a is a schematic view illustrating the axial swinging member of the dual-shaft hinge of FIG. 5 moving in the first guiding slot of the first core shaft according to the present invention.
FIG. 6b is a cross sectional view of FIG. 5 taken along a B-B line.

Please refer from FIG. 5 to FIG. 6b, the first core shaft 2 is clockwise rotated to a second angle, for example 90 degrees, so that an included angle of 90 degrees is formed between the first supporter A and the second supporter B. At this moment, the top guiding tenon 142 of the axial swinging member 14 is still abutted against the second terminal end 332 in the second guiding slot 33, and the bottom guiding tenon 141 of the axial swinging member 14 is displaced along the radial slot segment for being abutted against the right block end 233 (as shown in FIG. 6a), thereby forming a blocking status, and the first core shaft 2 is unable to be continuously rotated; at this moment, the bottom arc-shaped surface 151 of the radial moving member 15 and the first latching slot 24 of the first core shaft 2 are spaced with an interval, thereby forming a gap (as shown in FIG. 6b), and the top arc-shaped surface 152 is located in the second latching slot 34, thereby forming a first unlocking exchange, and the radial moving member 15 generates a downward radial movement due to the rotations of the second core shaft 3. In other words, with the first unlocking exchange status of the first core shaft 2 and the second core shaft 3, the first core shaft 2 is latched by the axial swinging member 14, thereby being locked and unable to rotate, the first core shaft 2 is formed in the locked status, and the second core shaft 3 is released from the radial moving member 15, thereby being in the unlocked status (because the outer circumference of the first core shaft 2 is not adjacent to the bottom arc-shaped surface 151, thus a gap is formed between the bottom arc-shaped surface 151 and the first latching slot 24, thereby allowing the radial moving member 15 to move and the bottom arc-shaped surface 151 is engaged with the first latching slot 24, and the second shaft bolt 16 is in contact with the top hole end of the elongated hole 153), thus only the second core shaft 3 is allowed to rotate. Accordingly, with the blocking and positioning effect of the axial swinging member 14 and the first guiding slot 23, an affection caused by the gap can be eliminated during the first unlocking exchange period.

Figure 7:
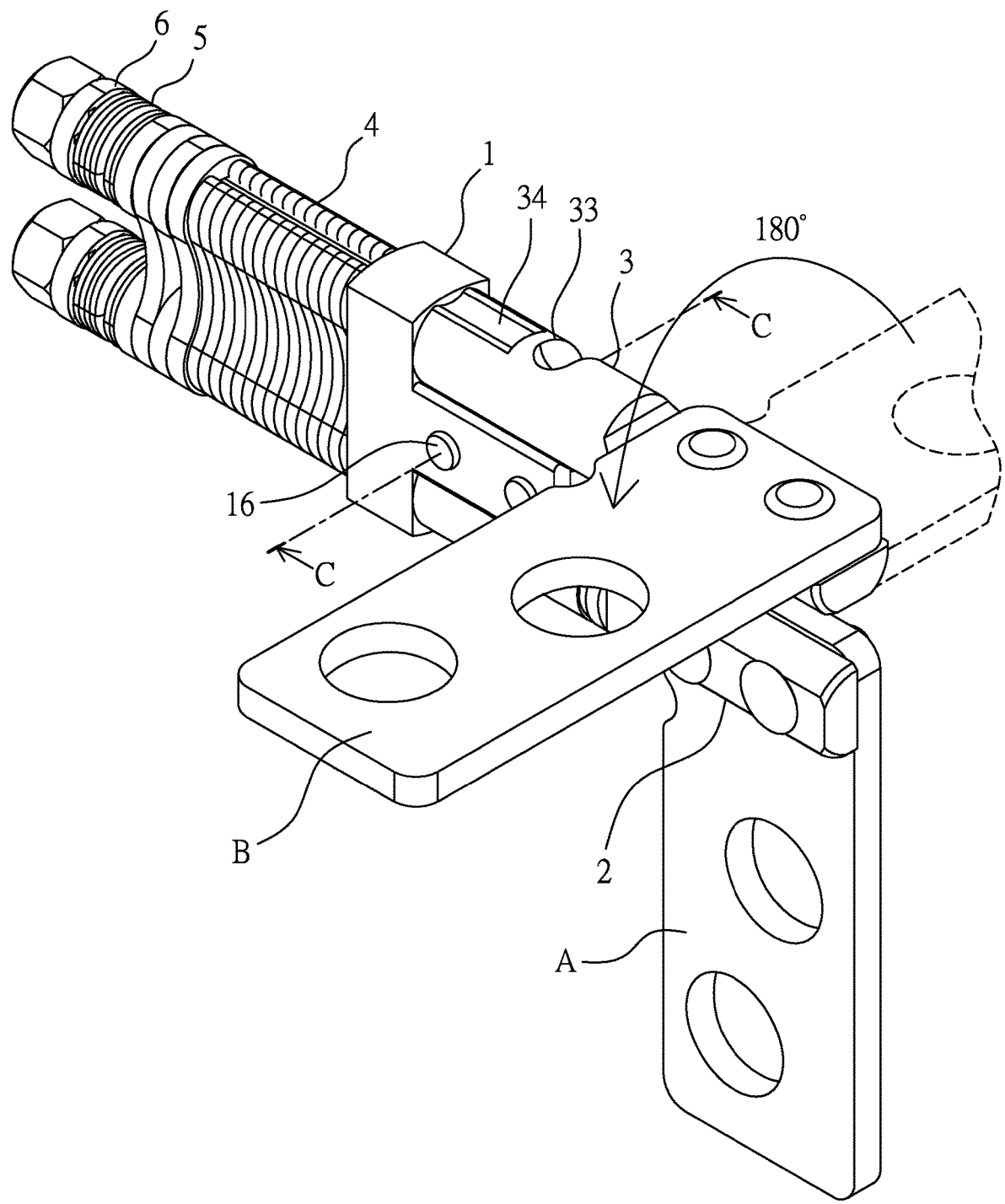
FIG. 7 is a perspective view illustrating the second core shaft being rotated 270 degrees relative to the first core shaft according to the present invention.
Figure 8A:
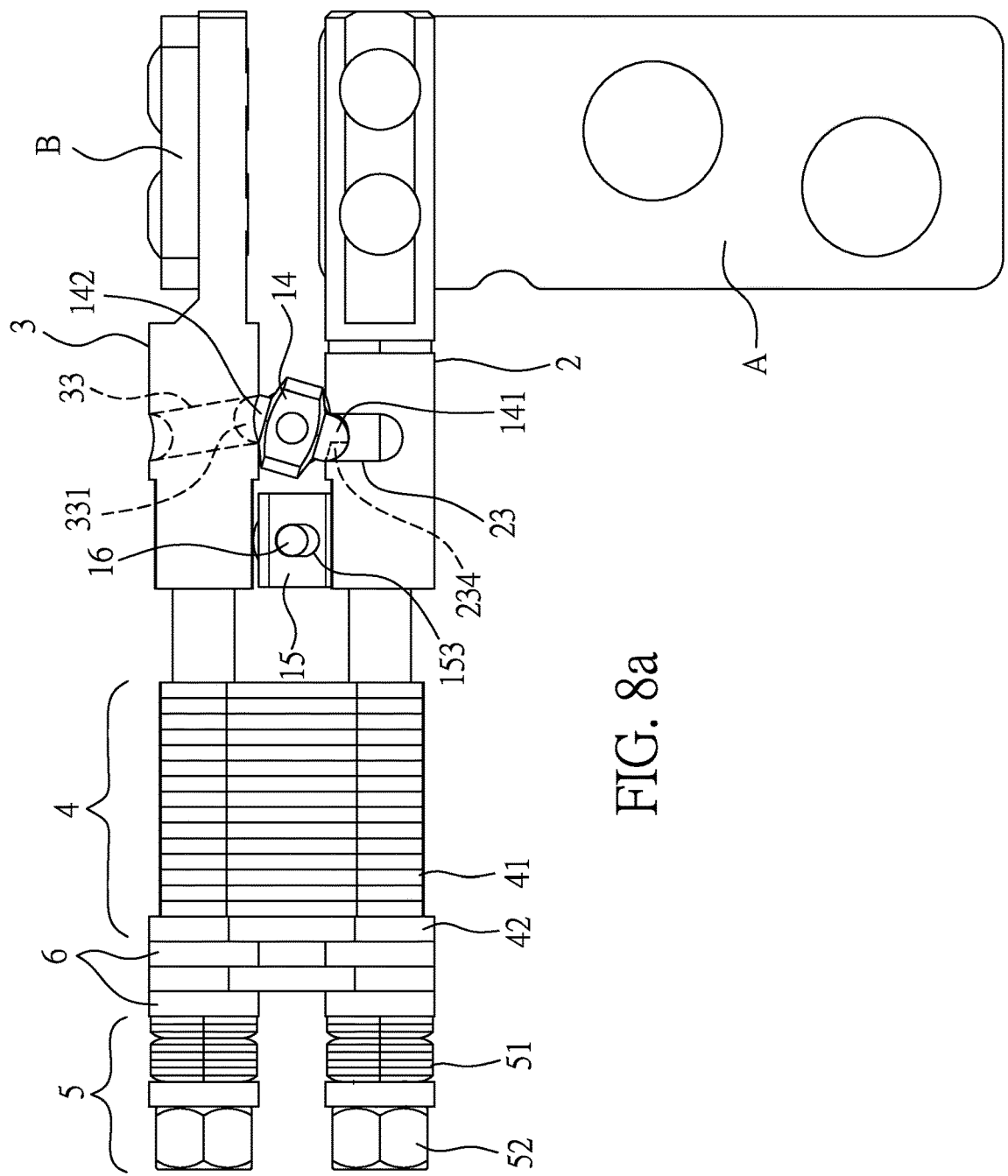
FIG. 8a is a schematic view illustrating a moving status of the axial swinging member of the dual-shaft hinge of FIG. 7 respectively moving in the first guiding slot of the first core shaft and the second guiding slot of the second core shaft according to the present invention.

Please refer from FIG. 7 to FIG. 8b, the second core shaft 3 is counterclockwise rotated to a third angle, for example 180 degrees, so that an angle of 270 degrees is formed between the first supporter A and the second supporter B. At this moment, the top guiding tenon 142 is forcedly to be displaced in the second guiding slot 33 thereby enabling the axial swinging member 14 to swing until the top guiding teonon 142 of the axial swinging 14 is abutted against the second start end 331 of the second guiding slot 33, thereby forming a blocking status, the second core shaft 3 is unable to be continuously rotated, and the bottom guiding tenon 141 of the axial swinging member 14 is displaced along the radial slot segment of the first guiding slot 23 for inwardly swinging till being abutted against the left block end 234 (as shown in FIG. 8a); at this moment, the bottom arc-shaped surface 151 of the radial moving member 15 is latched in the first latching slot 24 of the first core shaft 2, so that the second shaft bolt 16 is in contact with the top hole end of the elongated hole 153, and the top arc-shaped surface 152 and the other second latching slot 34 are spaced with an interval so as to form a gap (as shown in FIG. 8b), thereby forming a second unlocking exchange, and the radial moving member 15 generates an upward radial movement due to the rotations of the first core shaft 2. In other words, with the second unlocking exchange status of the first core shaft 2 and the second core shaft 3, the second core shaft 3 is latched by the axial swinging member 14, thereby being locked and unable to rotate, the second core shaft 3 is formed in the locked status, and the first core shaft 2 is released from the radial moving member 15, thereby being in the unlocked status (because the outer circumference of the second core shaft 3 is not adjacent to the top arc-shaped surface 152, thus a gap is formed between the top arc-shaped surface 152 and the other second latching slot 34, thereby allowing the radial moving member 15 to move, and the top arc-shaped surface 152 is latched with the other second latching slot 34, and the second shaft bolt 16 is in contact with the bottom hole end of the elongated hole 153), thus only the first core shaft 2 is allowed to rotate. Accordingly, with the blocking and positioning effect of the axial swinging member 14 and the second guiding slot 33, an affection caused by the gap can be eliminated during the second unlocking exchange period.

Figure 9:
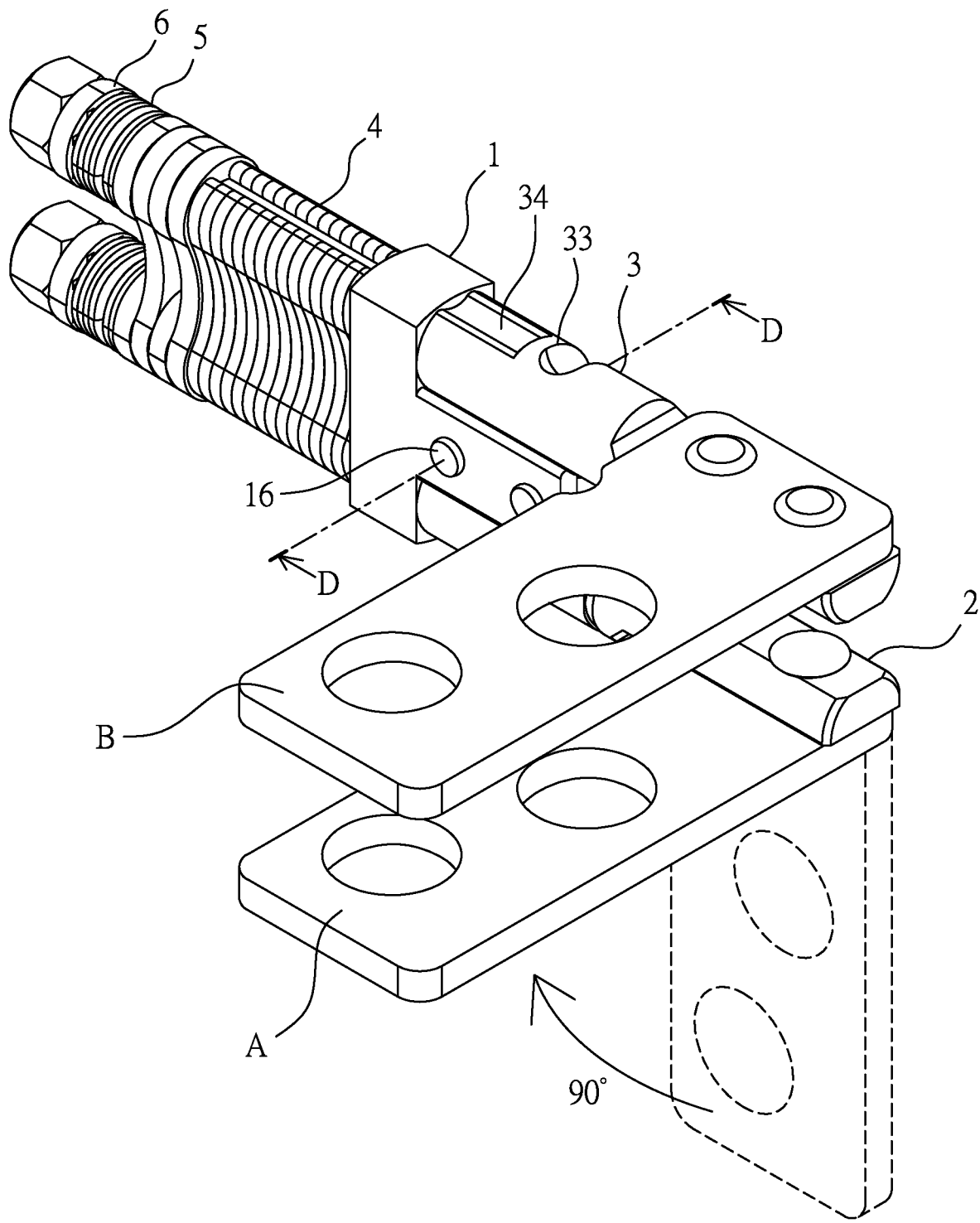
FIG. 9 is a perspective view illustrating the first core shaft being rotated 360 degrees relative to the second core shaft according to the present invention.
Figure 10B:
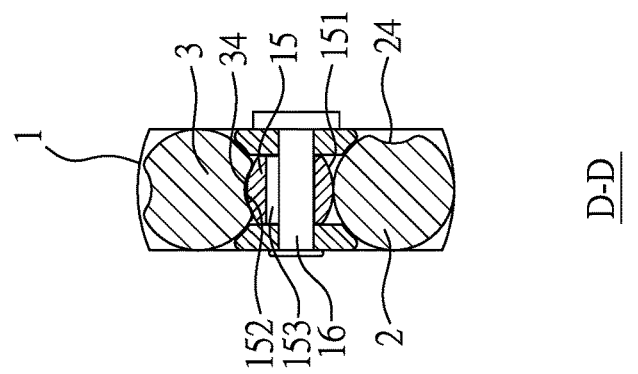
FIG. 10b is a cross sectional view of FIG. 9 taken along a D-D line.
Figure 10A:
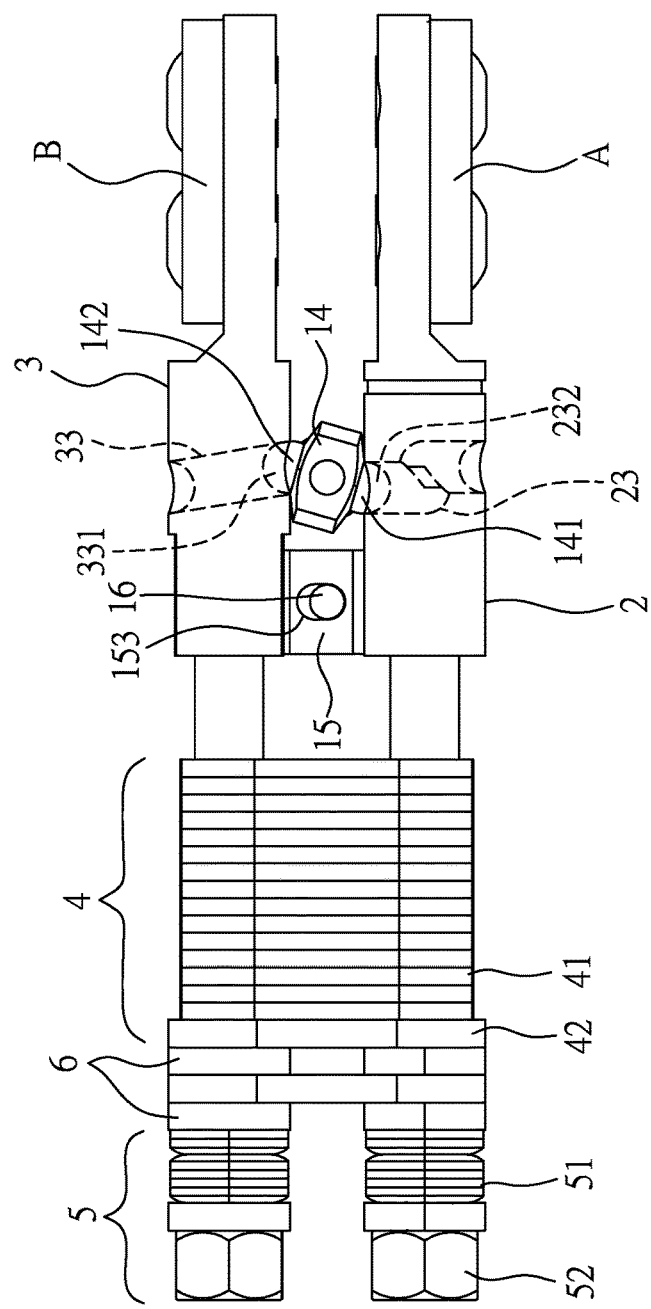
FIG. 10a is a schematic view illustrating a moving status of the axial swinging member of the dual-shaft hinge of FIG. 9 respectively moving in the first guiding slot of the first core shaft and the second guiding slot of the second core shaft according to the present invention.

Please refer from FIG. 9 to FIG. 10b, the first core shaft 2 is clockwise rotated to a fourth angle, for example 90 degrees, so that the first supporter A and the second supporter B are rotated to form in a 360-degree status. At this moment, the top guiding tenon 142 of the axial swinging member 14 is still abutted against the second start end 331 of the second guiding slot 33, and the bottom guiding tenon 141 of the axial swinging member 14 is displaced along the other radial slot segment in the first guiding slot 23 for being abutted against the first terminal end 232 (as shown in FIG. 10a), thereby forming a blocking status, and the first core shaft 2 is unable to be continuously rotated; at this moment, the bottom arc-shaped surface 151 of the radial moving member 15 is adjacent to the outer circumference of the first core shaft 2, and the top arc-shaped surface 152 is latched in the other second latching slot 34 (as shown in FIG. 10b, the second shaft bolt 16 is in contact with the bottom hole end of the elongated hole 153), thus the second core shaft 3 is formed in the locked status, and the first core shaft 2 is formed in the unlocked status, in other words, the second core shaft 3 is latched by the radial moving member 15 thereby being locked and unable to rotate, thus only the first core shaft 2 can be reversely rotated.

Based on the above-mentioned operation process, the included angle between the first supporter A and the second supporter B is adjusted through alternatively rotating the first core shaft 2 and the second core shaft 3, so that a folded status can be formed when the included angle between the main body and the screen of the electronic device is zero degrees, or an unfolded status can be formed when the main body and the screed are relatively rotated 360 degrees for allowing the screen to be reversely arranged relative to the main body, so that a rotating angle range of one of the core shafts is in a two-step status and preset to be firstly rotated, thereby preventing a situation of the two core shafts being freely rotated and also preventing a situation of each core shaft being rotated but not positioned (eliminating the affection caused by the gap during the unlocking exchange period of the two core shafts), and problems of electric signal wires being twisted or tangled can be solved.

Figure 4:
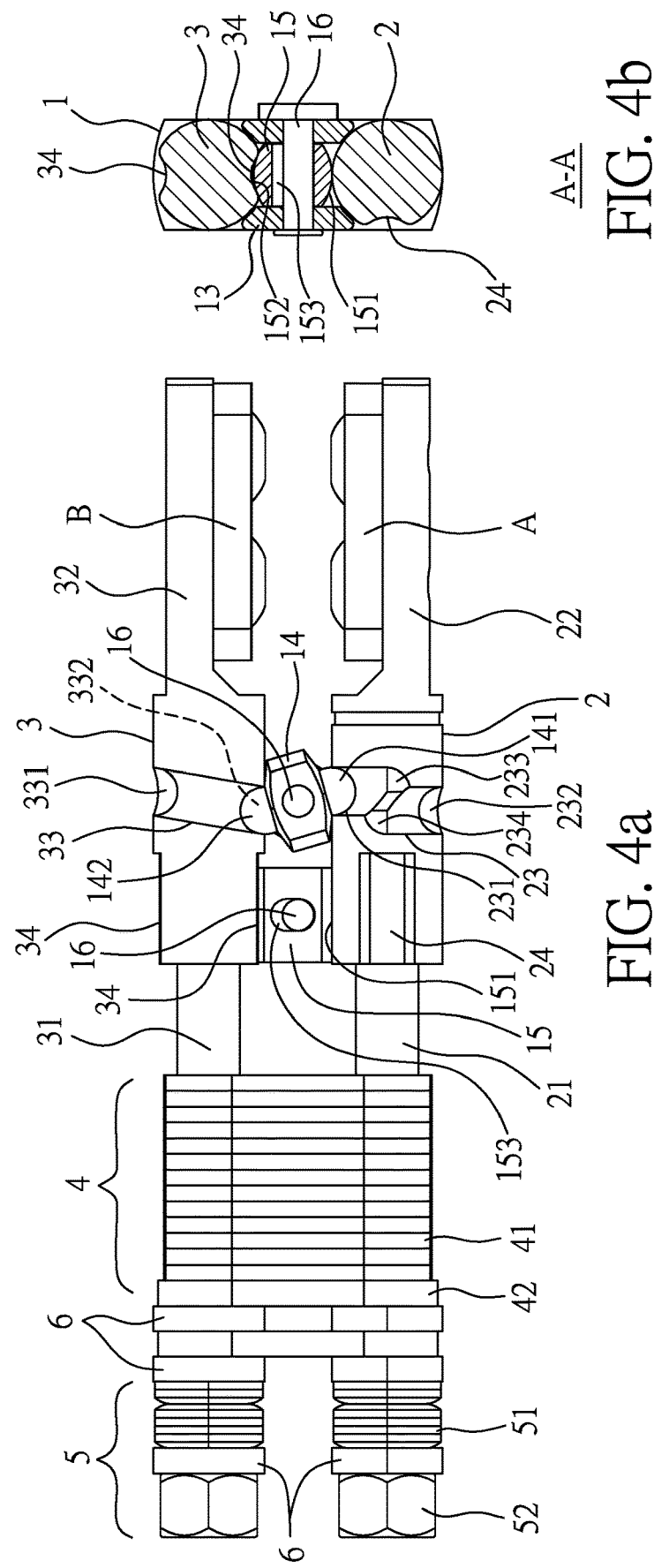
FIG. 4a is a front view illustrating the dual-shaft hinge of FIG. 3, wherein the side wall being removed for showing a starting status of the axial swinging member.
FIG. 4b is a cross sectional view of FIG. 3 taken along an A-A line.

When the status shown in FIG. 9 is desired to be recovered to the status shown in FIG. 3, a user only has to reversely operate, for example the first core shaft 2 is counterclockwise rotated from the fourth angle to the third angle for being in the status shown from FIG. 7 to FIG. 8b; then, the second core shaft 3 is clockwise rotated to the second angle for being in the status shown from FIG. 5 to FIG. 6b; lastly, the first core shaft 2 is clockwise rotated to the first angle for being in the status as shown from FIG. 3 to FIG. 4b.

Figure 11:
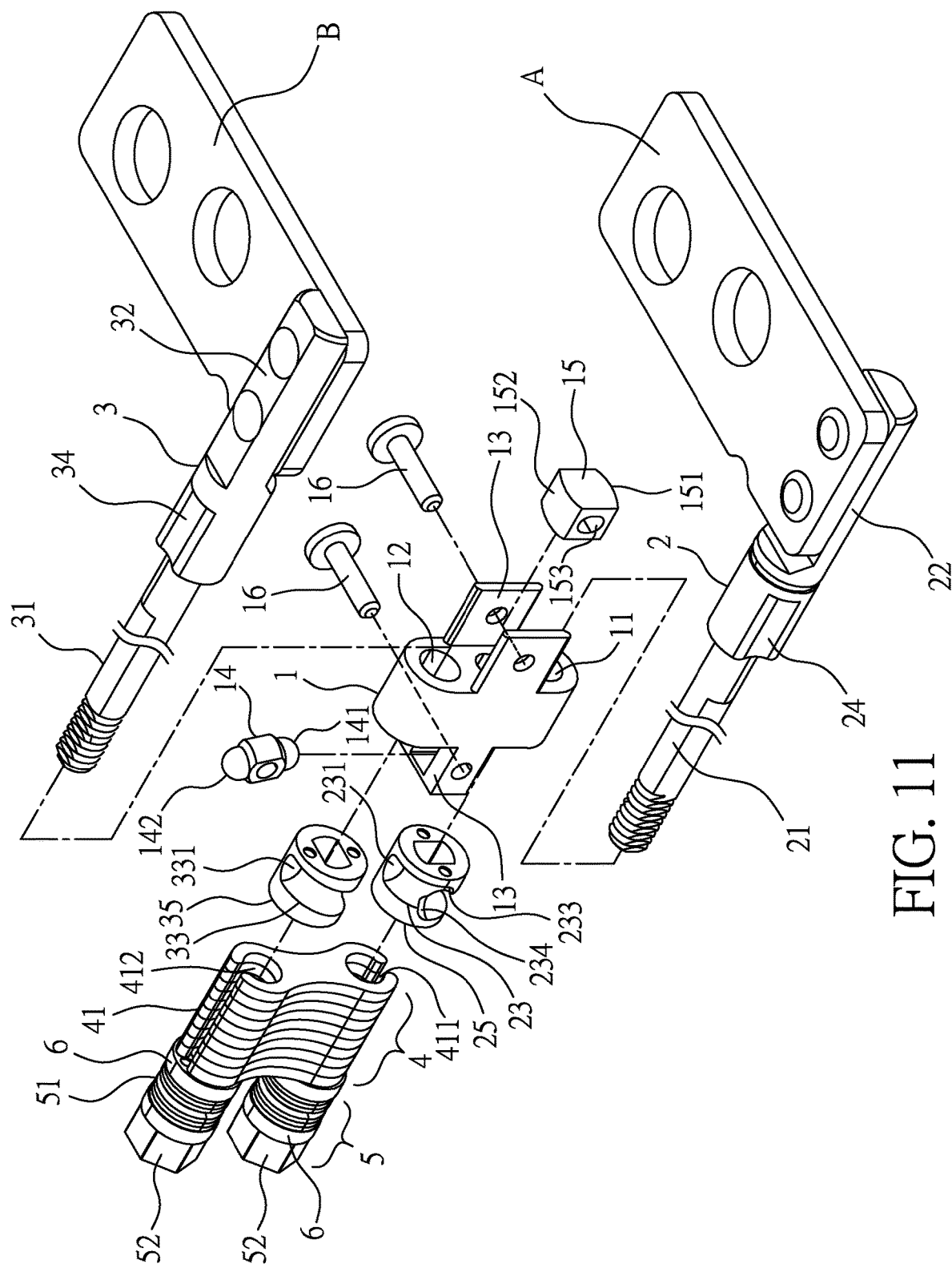
FIG. 11 is a perspective exploded view illustrating the dual-shaft hinge according to a second embodiment of the present invention.
Figure 12:
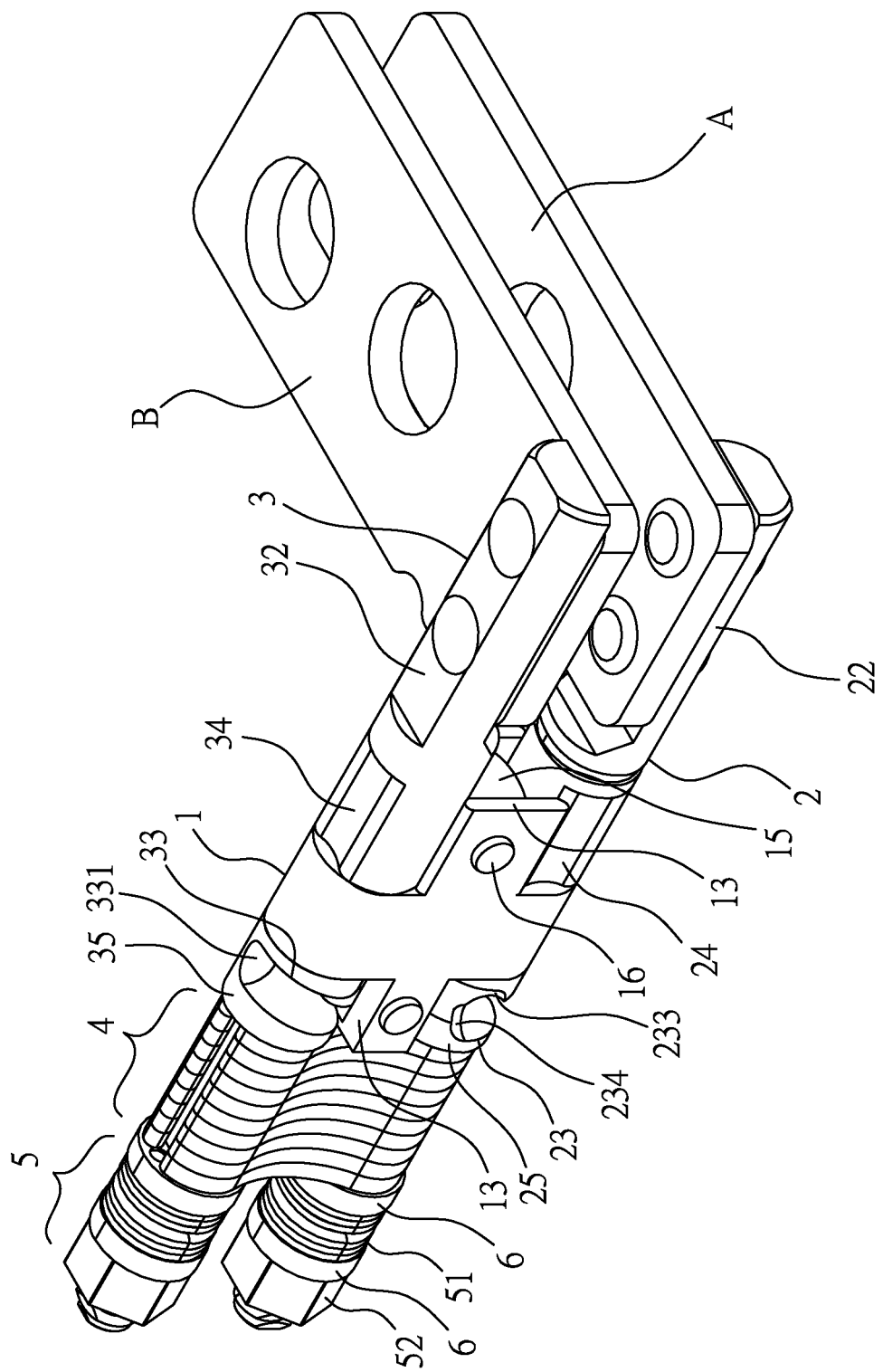
FIG. 12 is a perspective view illustrating the assembly of the dual-shaft hinge according to the second embodiment of the present invention.

Please refer to FIG. 11 and FIG. 12, which discloses a second embodiment of the dual-shaft hinge with alternative rotation provided by the present invention. The same codes (marks) used in this embodiment are defined as the same components as the first embodiment, because there are a lot of the components shared by this embodiment and the first embodiment, only differences between this embodiment and the first embodiment are provided.

The differences between this embodiment and the first embodiment are as follows. Two opposite sides of the pivotal base 1 are oppositely extended with a pair of side walls 13, wherein a first shaft bolt 16 is provided to pass the pair of side walls 13 at the left side so as to be pivoted with the axial swinging member 14, and a second shaft bolt 16 is provided to pass the pair of side walls 13 at the right side so as to be pivoted with the radial moving member 15. A lateral surface of the radial moving member 15 has an elongated hole 153 allowing the second shaft bolt 16 to pass, so that the second shaft bolt 16 is able to be in contact with a bottom hole end or a top hole end of the elongated hole 153 for forming a blocking status, respectively, thereby allowing the radial moving member 15 to be stably limited to radially displace between the pair of side walls 13 at the right side.

Moreover, an outer circumference of the first core shaft 2 has a first latching slot 24 at a location corresponding to the bottom arc-shaped surface 151; and an outer circumference of the second core shaft 3 has at least one second latching slot 34 at a location corresponding to the top arc-shaped surface 152.

Furthermore, the first shaft rod 21 is sleeved with a first linkage ring 25, an outer circumference of the first linkage ring 25 has a first guiding slot 23, which has been illustrated in the first embodiment, at a location corresponding to the bottom guiding slot 141 of the axial swinging member 14. The first guiding slot 23 has two radial slot segments parallel to each other, and an axial slot segment connected between the two radial slot segments; the interior of the first guiding slot 23 has a first start end 231, a first terminal end 232 (as shown in FIG. 2), and a right block end 233 and a left block end 234 oppositely disposed and arranged between the first start end 231 and the first terminal end 232. Wherein, the first start end 231 is disposed at one end of the two radial slot segments, the first terminal end 232 is disposed at another end of the two radial slot segments, and the right block end 233 and the left block end 234 are disposed at connecting locations defined at two opposite ends of the two radial slot segments and the axial slot segment. Moreover, because a rod segment of the first shaft rod 21 and a shaft hole of the first linkage ring 25 are correspondingly formed in a non-circular status, so that the first linkage ring 25 is able to synchronously rotate with the first core shaft 2. The second shaft rod 3 is sleeved with a second linkage ring 35, and an outer circumference of the second linkage ring 35 has a second guiding slot 33 at a location corresponding to the top guiding tenon 142 of the axial swinging member 14. The second guiding slot 33 is formed as an arc-shaped spiral slot, and the interior of the second guiding slot 33 has a second start end 331 and a second terminal end 332 (as shown in FIG. 2), because a rod segment of the second shaft rod 31 and a shaft hole of the second linkage ring 35 are correspondingly formed in a non-circular status, so that the second linkage ring 35 is able to synchronously rotate with the second core shaft 3.

Effects achieved by this embodiment are the same as the first embodiment, in other words, the included angle between the first supporter A and the second supporter B is adjusted through alternatively rotating the first core shat 2 and the second core shaft 3, so that a folded status can be formed when the included angle between the main body and the screen of the electronic device is zero degrees, or an unfolded status can be formed when the main body and the screed are relatively rotated 360 degrees for allowing the screen to be reversely arranged relative to the main body, As such, please refer to the operation process which has been illustrated from FIG. 3 to FIG. 10b, the same locking and unlocking alternative status as the first embodiment can be achieved.

Based on what has been disclosed above, advantages achieved by the present invention are as follows. With the blocking effect formed through the bottom guiding tenon and the top guiding tenon of the axial swinging member and the corresponding first guiding slot of the first core shaft and the corresponding second guiding slot of the second core shaft, and the locking and unlocking function provided by the radial moving member to the first latching slot of the first core shaft and the at least one second latching slot of the second core shaft, an alternative rotation of the first core shaft and the second core shaft can be realized. As such, according to the two embodiment provided by the present invention, disadvantages of the conventional axial moving member not having a sufficient structural strength and not easy to pass a service life requirement can be improved; moreover, an arrangement the two sets of block parts and the two fan-shaped block rings of the two conventional core shafts can be replaced, so that effects of simplifying production process, reducing processing procedures and required components, and lowering the production cost can be achieved; furthermore, the two core shafts can be assisted to be alternatively rotated and positioned, the affection caused by the gap during the unlocking exchange period of the two core shafts can be eliminated. Accordingly, the present invention is novel and more practical in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A dual-shaft hinge with alternative rotation, including:
   a pivotal base, axially formed with a bottom penetrated hole and a top penetrated hole, and having an axial swinging member radially protruded with a bottom guiding tenon and a top guiding tenon and a radial moving member radially formed with a bottom arc-shaped surface and a top arc-shaped surface pivoted at at least one side thereof and spaced with an interval;
   a first core shaft, having one end axially extended with a first shaft rod received in said bottom penetrated hole, wherein an outer circumference of said first core shaft has a first guiding slot and a first latching slot arranged at locations corresponding to said bottom guiding tenon and said bottom arc-shaped surface; an interior of said first guiding slot has a first start end and a first terminal end allowing said bottom guiding tenon to be abutted for forming a blocking effect, and a right block end and a left block end oppositely disposed and arranged between said first start end and said first terminal end, and said first core shaft is formed in an unlocked status when said first latching slot is engaged with said bottom arc-shaped surface; and
   a second core shaft, having one end axially extended with a second shaft rod received in said top penetrated hole, wherein an outer circumference of said second core shaft has a second guiding slot and at least one second latching slot arranged at locations corresponding to said top guiding tenon and said top arc-shaped surface; an interior of said second guiding slot has a second start end and a second terminal end allowing said top guiding tenon to be abutted for forming said blocking effect, and said second core shaft is formed in a locked status when said at least one second latching slot is engaged with said top arc-shaped surface, and said first core shaft is in said unlocked status, thereby enabling said first core shaft and said second core shaft to alternatively rotate.

2. The dual-shaft hinge with alternative rotation as claimed in claim 1, wherein said first core shaft has a first connection part disposed at another end thereof, said first connection part has a plurality of first fastening holes for allowing a first supporter to be connected; and said second core shaft has a second connection part disposed at another end thereof, said second connection part has a plurality of second fastening holes for allowing a second supporter to be connected.

3. The dual-shaft hinge with alternative rotation as claimed in claim 1, wherein said first latching slot is formed on a lateral surface of said first core shaft, there are two second latching slots, and said two second latching slots are respectively arranged on a top surface and a bottom surface of said second core shaft, thereby forming said locked status by being latched with said top arc-shaped surface.

4. The dual-shaft hinge with alternative rotation as claimed in claim 1, further including a torque unit, said torque unit has a plurality of sheet-like torque clipping sheets which are in mutually stacked status, a bottom end and a top end of each of said torque clipping sheets respectively have a C-shaped bottom clipper allowing said first shaft rod to be disposed and clipped, and a C-shaped top clipper allowing said second shaft rod to be disposed and clipped.

5. The dual-shaft hinge with alternative rotation as claimed in claim 4, wherein said torque unit further has at least one fastening sheet, said at least one fastening sheet is arranged to be adjacent to said torque clipping sheets, and a bottom end and a top end of each of said fastening sheets respectively have a bottom sheet hole allowing said first shaft rod to pass, and a top sheet hole allowing said second shaft rod to pass.

6. The dual-shaft hinge with alternative rotation as claimed in claim 5, wherein there are at least two fastening sheets, and a friction pad allowing said first shaft rod and said second shaft rod to pass and link is respectively disposed between said bottom sheet holes and said top sheet holes of said two adjacent fastening sheets.

7. The dual-shaft hinge with alternative rotation as claimed in claim 1, wherein said first core shaft and said second core shaft are respectively connected to a torque auxiliary adjusting unit, each of said torque auxiliary adjusting units has an elastic member respectively allowing said first shaft rod and said second shaft rod to pass, and a tightening member allowing said first shaft rod and said second shaft rod to be respectively tighten.

8. The dual-shaft hinge with alternative rotation as claimed in claim 7, wherein said elastic member is selected from a group consisted of a spring, a plurality of disc elastic sheets and a plurality of wave-shaped elastic sheets.

9. The dual-shaft hinge with alternative rotation as claimed in claim 7, wherein a friction pad is disposed between said elastic member and said tightening member.

10. The dual-shaft hinge with alternative rotation as claimed in claim 1, wherein at least one side of said pivotal base is oppositely extended with a pair of side walls, and two shaft bolts are disposed on said pair of side walls and spaced with an interval, one of said shaft bolts, defined as a first shaft bolt, is pivoted with said axial swinging member, and said other shaft bolt, defined as a second shaft bolt, is pivoted with said radial moving member; a lateral surface of said radial moving member has an elongated hole allowing said second shaft bolt to pass, so that said second shaft bolt is able to be in contact with a bottom hole of said elongated hole end when said top arc-shaped surface is engaged with said at least one second latching slot, and said second shaft bolt is able to be in contact with a top hole end of said elongated hole when said bottom arc-shaped surface is engaged with said first latching slot.

11. A dual-shaft hinge with alternative rotation, including:
a pivotal base, axially formed with a bottom penetrated hole and a top penetrated hole, and having an axial swinging member radially protruded with a bottom guiding tenon and a top guiding tenon and a radial moving member radially formed with a bottom arc-shaped surface and a top arc-shaped surface pivoted at at least one side thereof and spaced with an interval;
a first core shaft, having one end axially extended with a first shaft rod received in said bottom penetrated hole, wherein said first shaft rod is sleeved with a first linkage ring, said first linkage ring has a first guiding slot at a location corresponding to said bottom guiding tenon, and an outer circumference of said first core shaft has a first latching slot at a location corresponding to said bottom arc-shaped surface; an interior of said first guiding slot has a first start end and a first terminal end allowing said bottom guiding tenon to be abutted for forming a blocking effect, and a right block end and a left block end oppositely disposed and arranged between said first start end and said first terminal end, and said first core shaft is formed in an unlocked status when said first latching slot is engaged with said bottom arc-shaped surface; and
a second core shaft, having one end axially extended with a second shaft rod received in said top penetrated hole, said second shaft rod is sleeved with a second linkage ring, said second linkage ring has a second guiding slot at a location corresponding to said top guiding tenon, and an outer circumference of said second core shaft has at least one second latching slot at a location corresponding to said top arc-shaped surface; an interior of said second guiding slot has a second start end and a second terminal end allowing said top guiding tenon to be abutted for forming said blocking effect, and said second core shaft is formed in a locked status when said at least one second latching slot is engaged with said top arc-shaped surface, and said first core shaft is in an unlocked status, thereby enabling said first core shaft and said second core shaft to alternatively rotate.

12. The dual-shaft hinge with alternative rotation as claimed in claim 11, wherein said first core shaft has a first connection part disposed at another end thereof, said first connection part has a plurality of first fastening holes for allowing a first supporter to be connected; and said second core shaft has a second connection part disposed at another end thereof, said second connection part has a plurality of second fastening holes for allowing a second supporter to be connected.

13. The dual-shaft hinge with alternative rotation as claimed in claim 11, wherein said first latching slot is formed on a lateral surface of said first core shaft, there are two second latching slots, and said two second latching slots are respectively arranged on a top surface and a bottom surface of said second core shaft, thereby forming said locked status by being latched with said top arc-shaped surface.

14. The dual-shaft hinge with alternative rotation as claimed in claim 11, further including a torque unit, said torque unit has a plurality of sheet-like torque clipping sheets which are in mutually stacked status, a bottom end and a top end of each of said torque clipping sheets respectively have a C-shaped bottom clipper allowing said first shaft rod to be disposed and clipped, and a C-shaped top clipper allowing said second shaft rod to be disposed and clipped.

15. The dual-shaft hinge with alternative rotation as claimed in claim 14, wherein said torque unit further has at least one fastening sheet, said at least one fastening sheet is arranged to be adjacent to said torque clipping sheets, and a bottom end and a top end of each of said fastening sheets respectively have a bottom sheet hole allowing said first shaft rod to pass, and a top sheet hole allowing said second shaft rod to pass.

16. The dual-shaft hinge with alternative rotation as claimed in claim 15, wherein there are at least two fastening sheets, and a friction pad allowing said first shaft rod and said second shaft rod to pass and link is respectively disposed between said bottom sheet holes and said top sheet holes of said two adjacent fastening sheets.

17. The dual-shaft hinge with alternative rotation as claimed in claim 11, wherein said first core shaft and said second core shaft are respectively connected to a torque auxiliary adjusting unit, each of said torque auxiliary adjusting units has an elastic member respectively allowing said first shaft rod and said second shaft rod to pass, and a tightening member allowing said first shaft rod and said second shaft rod to be respectively tighten.

18. The dual-shaft hinge with alternative rotation as claimed in claim 17, wherein said elastic member is selected from a group consisted of a spring, a plurality of disc elastic sheets and a plurality of wave-shaped elastic sheets.

19. The dual-shaft hinge with alternative rotation as claimed in claim 17, wherein a friction pad is disposed between said elastic member and said tightening member.

20. The dual-shaft hinge with alternative rotation as claimed in claim 11, wherein two opposite sides of said pivotal base are oppositely extended with a pair of side walls, a first shaft bolt is provided to pass one pair of said two pairs of side walls so as to be pivoted with said axial swinging member, and a second shaft bolt is provided to pass said other pair of side walls so as to be pivoted with said radial moving member; a lateral surface of said radial moving member has an elongated hole allowing said second shaft bolt to pass, so that said second shaft bolt is able to be in contact with a bottom hole end of said elongated hole when said top arc-shaped surface is engaged with said at least one second latching slot, and said second shaft bolt is able to be in contact with a top hole end of said elongated hole when said bottom arc-shaped surface is engaged with said first latching slot.

\* \* \* \* \*